(12) United States Patent
Son et al.

(10) Patent No.: US 9,231,440 B2
(45) Date of Patent: Jan. 5, 2016

(54) POWER SUPPLY APPARATUS AND CONTROLLING METHOD OF THE SAME

(75) Inventors: Seung-Hyun Son, Yongin-si (KR); Chan-Jae Lee, Yongin-si (KR); Gon-Jin Chung, Yongin-si (KR); Bo-Ra Choi, Yongin-si (KR); Sin-Young Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 394 days.

(21) Appl. No.: 13/597,952

(22) Filed: Aug. 29, 2012

(65) Prior Publication Data

US 2013/0278216 A1      Oct. 24, 2013

Related U.S. Application Data

(60) Provisional application No. 61/635,207, filed on Apr. 18, 2012.

(51) Int. Cl.
*H02J 7/00* (2006.01)
*H02J 9/06* (2006.01)

(52) U.S. Cl.
CPC ............... *H02J 9/062* (2013.01); *H02J 7/0016* (2013.01); *H02J 7/0024* (2013.01); *H02J 7/00* (2013.01); *H02J 7/0019* (2013.01); *Y10T 307/62* (2015.04)

(58) Field of Classification Search
CPC ......... H02J 7/0019; H02J 7/0024; H02J 7/00; H02J 7/0016; Y02E 60/12
USPC ......... 320/117, 118, 120–122, 127–128, 132, 320/135
See application file for complete search history.

(56) References Cited

U.S. PATENT DOCUMENTS

| 4,673,826 A | 6/1987 | Masson |
| 5,883,496 A * | 3/1999 | Esaki et al. ................... 320/132 |
| 2007/0001646 A1* | 1/2007 | Kojima ......................... 320/128 |
| 2007/0126399 A1* | 6/2007 | Benckenstein et al. ....... 320/119 |

(Continued)

FOREIGN PATENT DOCUMENTS

| EP | 2346138 A2 | 7/2011 |
| JP | 2007-240299 | 9/2007 |

(Continued)

OTHER PUBLICATIONS

EPO Office action dated Jan. 23, 2015, for corresponding European Patent application 12184277.7, (3 pages).

(Continued)

*Primary Examiner* — Stacy Whitmore
(74) *Attorney, Agent, or Firm* — Christie, Parker & Hale, LLP

(57) ABSTRACT

A power supply including: a power supply circuit for receiving an external power and a battery power, and for outputting a power including at least one of the external power or the battery power to a load; and a battery pack coupled to the power supply circuit, the battery pack including a plurality of batteries, which are arranged into a plurality of battery groups including a first battery group and a second battery group, and configured to provide the battery power. Where, the battery pack is configured to selectively supply a power of the first battery group or a power of the second battery group as the battery power to the power supply circuit according to at least one of a status of the external power, a status of the load, a status of the first battery group, or a status of the second battery group.

17 Claims, 11 Drawing Sheets

(56) References Cited

U.S. PATENT DOCUMENTS

| | | | |
|---|---|---|---|
| 2008/0203995 A1* | 8/2008 | Carrier et al. | 323/351 |
| 2008/0309288 A1* | 12/2008 | Benckenstein et al. | 320/119 |
| 2009/0015191 A1* | 1/2009 | Benckenstein et al. | 320/102 |
| 2009/0015207 A1* | 1/2009 | Ibrahim | 320/145 |
| 2009/0066291 A1* | 3/2009 | Tien et al. | 320/118 |
| 2009/0102421 A1* | 4/2009 | Imai | 320/118 |
| 2009/0167243 A1* | 7/2009 | Xiao et al. | 320/122 |
| 2009/0243540 A1* | 10/2009 | Choi et al. | 320/107 |
| 2009/0289599 A1* | 11/2009 | White et al. | 320/120 |
| 2010/0271035 A1 | 10/2010 | Heo et al. | |
| 2010/0327807 A1* | 12/2010 | Kikinis et al. | 320/116 |
| 2011/0115295 A1 | 5/2011 | Moon et al. | |
| 2011/0140649 A1 | 6/2011 | Choi | |
| 2011/0204898 A1 | 8/2011 | Kim et al. | |
| 2011/0316483 A1* | 12/2011 | Zhang | 320/118 |
| 2012/0013180 A1* | 1/2012 | Muto et al. | 307/9.1 |
| 2012/0025614 A1 | 2/2012 | Taimela et al. | |
| 2012/0025615 A1 | 2/2012 | Kim et al. | |
| 2012/0196159 A1* | 8/2012 | Zhang et al. | 429/50 |
| 2012/0249075 A1* | 10/2012 | Hori et al. | 320/118 |
| 2012/0319658 A1* | 12/2012 | White et al. | 320/134 |
| 2013/0009600 A1* | 1/2013 | Jeong et al. | 320/118 |
| 2013/0033231 A1* | 2/2013 | Zhang | 320/116 |
| 2013/0113290 A1 | 5/2013 | Sato et al. | |
| 2013/0119935 A1* | 5/2013 | Sufrin-Disler et al. | 320/116 |

FOREIGN PATENT DOCUMENTS

| | | |
|---|---|---|
| JP | 2010-257884 A | 11/2010 |
| JP | 2011-244581 | 12/2011 |
| KR | 10-2010-0052417 | 5/2010 |
| KR | 10-2010-0061395 | 6/2010 |
| KR | 10-2011-0055389 A | 5/2011 |
| KR | 10-2011-0067857 A | 6/2011 |
| KR | 10-2012-0011237 | 2/2012 |

OTHER PUBLICATIONS

European Search Report dated Sep. 4, 2013 of the corresponding European Patent Application No. 12184277.7, noting listed references in this IDS (6 pages).
Patent Abstracts of Japan and English Machine Translation of Japanese Publication No. 2010-257884, listed above (20 pages).
English Machine Translation of JP 2007-240299, 34 pages.
Translation of KIPO dated Dec. 16, 2013, issued in Patent Application No. 10-2012-0105938 (10 pages).
Translation of KIPO dated Aug. 1, 2014, issued in Patent Application No. 10-2012-0105938 (1 page).

* cited by examiner

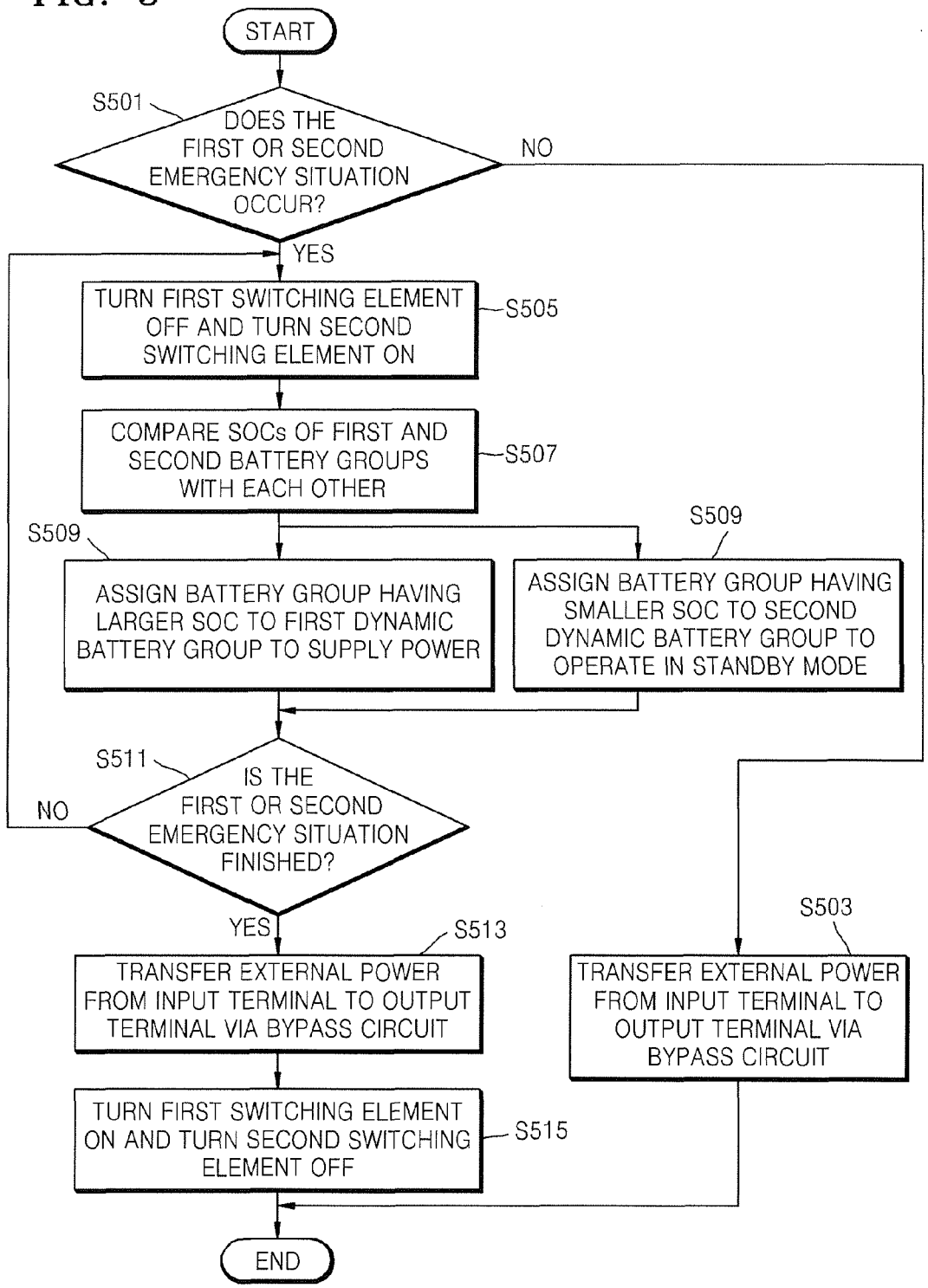

POWER SUPPLY APPARATUS AND CONTROLLING METHOD OF THE SAME

CROSS-REFERENCE TO RELATED PATENT APPLICATIONS

This application claims priority to and the benefit of U.S. Provisional Application No. 61/635,207, filed on Apr. 18, 2012, in the United States Patent and Trademark Office, the entire disclosure of which is incorporated herein by reference.

BACKGROUND

1. Field

Aspects of embodiments of the present invention relate to a power supply apparatus and a controlling method of the same.

2. Background of the Related Art

A power supply apparatus is an apparatus for temporarily supplying power to prevent damage to a load or to save data the load processes when an abnormal situation occurs in a power source that supplies power to the load (e.g., a blackout).

The power supply apparatus includes an internal battery to store electric energy. When an abnormal situation occurs in a power source for supplying power to a load, as described above, the power supply apparatus supplies the electric energy stored in the battery to the load. Also, the power supply apparatus includes a battery controller for controlling the battery to detect a state of the battery or to control charge/discharge operations of the battery.

SUMMARY

Aspects of embodiments of the prevent invention provide a power supply apparatus, including a plurality of battery groups of batteries, capable of stably supplying power to a load during a blackout or during a particular time period, and a controlling method of the same.

According to an embodiment of the present invention, a power supply includes: a power supply circuit configured to receive a first power from an external power source, to receive a battery power, and to output a second power including at least one of the first power or the battery power to an external load; and a battery pack coupled to the power supply circuit, the battery pack including a plurality of batteries, which are arranged into a plurality of battery groups including a first battery group and a second battery group, and configured to provide the battery power, wherein the battery pack is configured to selectively supply a power of the first battery group or a power of the second battery group as the battery power to the power supply circuit according to at least one of a status of the external power source, a status of the external load, a status of the first battery group, or a status of the second battery group.

The power supply may further include: a controller configured to control the power supply circuit and the battery pack according to at least one of the status of the external power source, the status of the external load, the status of the first battery group, or the status of the second battery group, wherein the battery pack may further include a battery management system configured to control charging and discharging of each of the first battery group and the second battery group according to a battery control signal from the controller.

In one embodiment, the power supply circuit includes: an input terminal configured to receive the first power; an output terminal configured to output the second power; a first power converter coupled between the input terminal and a first node, and configured to convert the first power to a converted first power having a voltage suitable for charging the batteries, and to output the converted first power to the first node; and a second power converter coupled between the first node and the output terminal, and configured to convert the converted first power or the battery power to the second power having a voltage suitable for use by the external load, and to output the second power to the output terminal, and the first battery group and the second battery group are selectively electrically coupled to the first node.

The power supply circuit may further include a bypass circuit coupled between the input terminal and the output terminal, and configured to transfer the first power to the output terminal without conversion in response to a bypass control signal from the controller.

The power supply circuit may further include: a first switch interposed between the input terminal and the first power converter, and configured to electrically couple the input terminal to the first power converter in response to a first switch control signal from the controller; and a second switch interposed between the second power converter and the output terminal, and configured to electrically couple the second power converter to the output terminal in response to a second switch control signal from the controller.

In one embodiment, the battery pack further includes: a first battery group switch interposed between the first node and the first battery group, and configured to electrically couple the first battery group to the first node in response to a first battery group switch control signal from the battery management system; and a second battery group switch interposed between the first node and the second battery group, and configured to electrically couple the second battery group to the first node in response to a second battery group switch control signal from the battery management system, and the battery management system is configured to generate the first and second battery group switch control signals according to the battery control signal.

The controller may be configured to: determine an occurrence of a first emergency situation or a second emergency situation, which is different from the first emergency situation, according to at least one of the status of the external source or the external load.

The controller may be configured to: when the controller determines the first emergency situation has occurred, generate the battery control signal to selectively discharge the first battery group or the second battery group such that the second power includes the power of the first battery group or the second battery group, and to operate the non-selected one of the first and second battery groups in a stand-by mode; determine whether or not the first emergency situation has finished; after the first emergency situation has finished, generate the battery control signal to stop discharging the selected one of the first and second battery groups; and select between the first and second battery groups for discharge.

In one embodiment, the controller is configured to dynamically select between the first and second battery groups for discharge.

In one embodiment, the power supply circuit is configured to concurrently supply the first power and the power of the first battery group or the second battery group, such that the second power includes the power of the first battery group or the second battery group, and the first power.

The controller may be configured to: compare state of charge (SOC) values of the plurality of battery groups to each other; when the SOC value of one of the plurality of battery groups is the greatest among the SOC values of all of the plurality of battery groups, generate the battery control signal to discharge the one of the battery groups such that the second power includes the power of the one of the battery groups, and to operate all other ones of the plurality of battery groups in a stand-by mode; determine whether or not the first emergency situation or the second emergency situation has finished; and after the first emergency situation or the second emergency situation has finished, generate the battery control signal to stop discharging the one of the plurality of battery groups.

The controller may be configured to: compare discharge numbers of the plurality of battery groups to each other; when the discharge number of one of the plurality of battery groups is the least from among the discharge numbers, generate the battery control signal to discharge the one of the plurality of battery groups, and to operate all other ones of the plurality of battery groups in a stand-by mode; determine whether or not the first emergency situation or the second emergency situation has finished; and after the first emergency situation or the second emergency situation has finished, generate the battery control signal to stop discharging the one of the plurality of battery groups.

In one embodiment, the controller is configured to: compare temperatures of the plurality of battery groups to each other; when the temperature of one of the plurality of battery groups is the least from among the temperatures of the plurality of battery groups, generate the battery control signal to discharge the one of the battery groups such that the second power includes the power of the one of the battery groups, and to operate all other ones of the plurality of battery groups in a stand-by mode; determine whether or not the first emergency situation or the second emergency situation has finished; and after the first emergency situation or the second emergency situation has finished, generate the battery control signal to stop discharging the one of the plurality of battery groups.

The controller may be configured to: determine the occurrence of the first emergency situation when a stoppage of the external power source occurs; and determine the occurrence of the second emergency situation when a power requirement of the external load is greater than the power of the external power source.

In one embodiment, the battery pack further includes: a first temperature sensor configured to sense a temperature of the first battery group and to transmit the sensed temperature of the first battery group to the battery management system; and a second temperature sensor configured to sense a temperature of the second battery group and to transmit the sensed temperature of the second battery group to the battery management system.

According to another embodiment of the present invention, a battery pack for supplying power to an external device includes: a plurality of batteries, which are arranged into a plurality of battery groups; and a battery management system configured to: monitor a status of each of the battery groups, each status including at least one of a state of charge (SOC), a discharge number, or a temperature of a corresponding one of the battery groups; monitor a status of the external device; select at least one of the battery groups from among the battery groups to discharge its power to the external device according to the status of each of the battery groups and the status of the external device; and control the remaining battery groups that were not selected to operate in a stand-by mode.

The battery pack may further include a plurality of switches, wherein each switch is coupled to a corresponding one of the battery groups and an output node, and the battery management system is configured to control the switches to selectively couple the battery groups to the output node.

The battery management system may be configured to: compare the state of charge (SOC) values of the battery groups to each other; and when the SOC value of one of the battery groups is the greatest among the SOC values of all of the battery groups, select the one of the battery groups to discharge its power to the external device, and operate all other ones of the battery groups in a stand-by mode.

The battery management system may be configured to: compare the temperature values of the battery groups to each other; and when the temperature value of one of the battery groups is the lowest among the temperature values of all of the battery groups, select the one of the battery groups to discharge its power to the external device, and operate all other ones of the battery groups in a stand-by mode.

The battery management system may be configured to: compare the discharge numbers of the battery groups to each other; and when the discharge numbers of one of the battery groups is the lowest among the discharge numbers of all of the battery groups, select the one of the battery groups to discharge its power to the external device, and operate all other ones of the battery groups in a stand-by mode.

As described above, according to aspects of embodiments of the present invention, batteries provided in a power supply apparatus are formed in a plurality of battery groups, and thus, according to the type of emergency or states of the battery groups, while at least one battery group operates in a power supply mode, another battery group may operate in a standby mode so that power may be stably supplied to a load.

BRIEF DESCRIPTION OF THE DRAWINGS

The accompanying drawings illustrate exemplary embodiments of the present invention, and together with the description, serve to explain aspects of embodiments of the present invention. It will be understood that these drawings depict only certain embodiments in accordance with the disclosure and, therefore, are not to be construed as limiting the scope of the present invention.

FIG. 5 is a flowchart showing a method of controlling a power supply apparatus according to another embodiment of the present invention.

DETAILED DESCRIPTION

Figure 1:
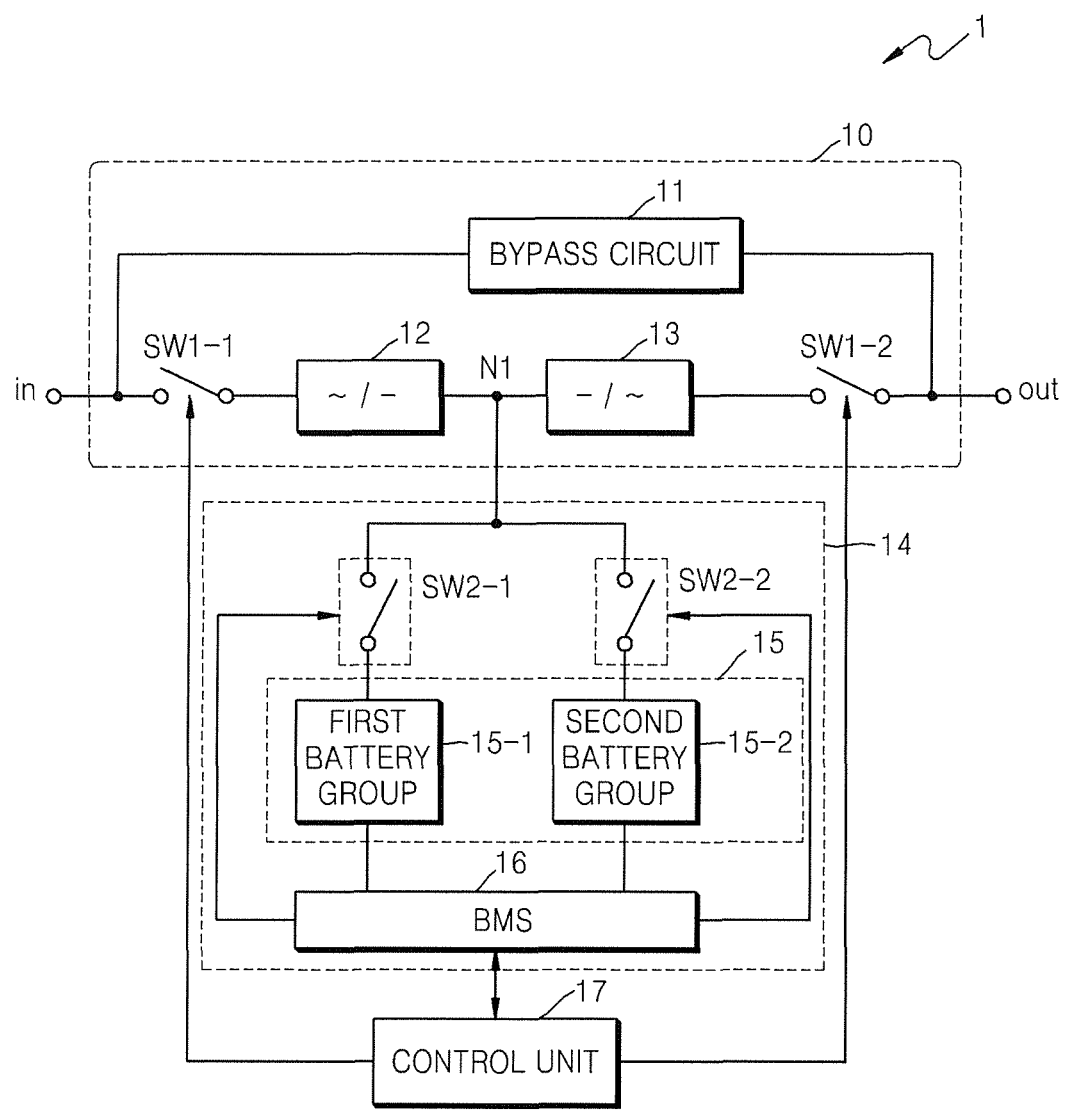
FIG. 1 is a block diagram illustrating a power supply apparatus according to an embodiment of the present invention.

Aspects of embodiments of the present invention will now be described more fully with reference to the accompanying drawings, in which exemplary embodiments of the present invention are shown. However, the present invention is not limited thereto and it will be understood that various changes in form and details may be made therein without departing from the spirit and scope of the appended claims (and equivalents thereof). Hereinafter, like reference numerals denote like elements and repeated descriptions thereof may be omitted.

The terms such as "first" and "second" are used herein merely to describe a variety of constituent elements, but the constituent elements are not limited by the terms. The terms may be used only for the purpose of distinguishing one constituent element from another constituent element.

The terms used in the present specification are used for explaining a specific exemplary embodiment, not limiting the present inventive concept. Thus, the expression of singularity in the present specification includes the expression of plurality unless clearly specified otherwise in context. Also, the terms such as "include" or "comprise" may be construed to denote a certain characteristic, number, step, operation, constituent element, or a combination thereof, but may not be construed to exclude the existence of or a possibility of an addition of one or more other characteristics, numbers, steps, operations, constituent elements, or combinations thereof.

Throughout the specification, when a first element is referred to as being "coupled" (e.g., electrically coupled or connected) to a second element, the first element may be directly coupled to the second element, or indirectly coupled to the second element via one or more intervening elements.

FIG. 1 is a block diagram illustrating a power supply apparatus according to an embodiment of the present invention.

Referring to FIG. 1, a power supply apparatus 1 according to the present embodiment includes a power supply circuit 10, a battery pack 14, and a control unit 17. Also, the power supply apparatus 1 includes an input terminal "in" and an output terminal "out".

Power from an external power source (e.g., the grid or a generator) may be applied to the input terminal "in" to be supplied to a load.

The output terminal "out" may be coupled to the load to output an external power to the load. Also, when a blackout occurs (e.g., a blackout caused by a malfunction of the external power source) or an overload is generated (e.g., an overload where the supplied power exceeds a maximum supplied power for a particular time period), the output terminal "out" may be provided with electric energy stored in a battery 15 to output a first AC power to the load.

The power supply circuit 10 supplies power for operations of the load and a battery management system (BMS) 16. The power supply circuit 10 may include a bypass circuit 11, a first switching element SW1-1, a second switching element SW1-2, a first power conversion unit 12, and a second power conversion unit 13.

The bypass circuit 11 may be coupled between the input terminal "in" and the output terminal "out" and may transfer the external power directly to the output terminal "out" without conversion.

The first switching element SW1-1 is controlled to selectively supply the external power from the input terminal "in" to the first power conversion unit 12. When the first switching element SW1-1 is in an ON state, it supplies the external power to the first power conversion unit 12. When the first switching element SW1-1 is in an OFF state, it stops the supply of the external power to the first power conversion unit 12. The ON/OFF operations of the first switching element SW1-1 may be controlled by the control unit 17.

The first power conversion unit 12 is coupled between the first switching element SW1-1 and a first node N1, and converts the received external power to a first DC power and outputs the first DC power to the first node N1. In other words, the first power conversion unit 12 may be a rectifier or a converter for converting AC to DC. During the conversion to the first DC power, the first power conversion unit 12 provides the first DC power at a voltage that may be used for charging the battery 15.

The second power conversion unit 13 is coupled between the first node N1 and the second switching element SW1-2. The second power conversion unit 13 converts the first DC power from the first power conversion unit 12 or from the electric energy stored in the battery 15 to a first AC power and outputs the first AC power. In other words, the second power conversion unit 13 may be an inverter for converting DC to AC. During the conversion to the first AC power, the second power conversion unit 13 provides the first AC power at a voltage that may be used by the load. Additionally, the second power conversion unit 13 may provide other functions, such as controlling an amplitude and/or phase of the first AC power such that it is output at substantially the same amplitude and/or phase as that of the external power.

The second switching element SW1-2 is controlled so that the first AC power output from the second power conversion unit 13 is selectively supplied to the output terminal "out". When the second switching element SW1-2 is in an ON state, it supplies the first AC power to the output terminal "out". When the second switching element SW1-2 is in an OFF state, it stops the supply of the first AC power to the output terminal "out". The ON/OFF operations of the second switching element SW1-2 may be controlled by the control unit 17.

The battery pack 14 stores electric energy and supplies the stored electric energy to the load for emergency situations. Emergency situations may be characterized as different types. For example, embodiments of the present invention characterize an emergency situation as a first emergency situation or a second emergency situation. The first emergency situation may be a case in which a blackout is caused by a malfunction of the external power source or a case in which a blackout is caused due to an overload. The second emergency situation may be a case when a load power exceeds a supplied power due to, for example, an abrupt change in the load for a particular time period. The particular time period for the above-example second emergency situation may be, for example, a time period between noon to 2 p.m. in the summer season, a time period between 10 p.m. to midnight in the winter season, a time period between July to August in the summer season, or a time period between December to February in the winter season. The particular time period is not limited to the above examples. Also, the second emergency situation may be a case when the requirement of the external load is greater than the power of the external power source or nearing the available power of the external power source.

In the present embodiment, the battery pack 14 includes the battery 15, the BMS 16, a third switching element SW2-1, and a fourth switching element SW2-2.

The battery 15 is a rechargeable secondary battery. The battery 15 may be formed by serially and/or parallelly connecting a plurality of battery cells, or by serially and/or parallelly connecting battery modules, each battery module including a plurality of battery cells. Since the battery 15 supplies electric energy to the load when an emergency situation occurs, a battery cell exhibiting a large capacity characteristic may be used as the battery cell. The battery 15 may include at least one battery cell. The battery 15 may be a rechargeable secondary battery such as a nickel-cadmium battery, a nickel metal hydride (NiMH) battery, a lithium ion battery, and a lithium polymer battery.

In embodiments of the present invention, the battery 15 is divided into a plurality of battery groups. For example, in the present embodiment, the battery 15 is divided into a first battery group 15-1 and a second battery group 15-2. The first battery group 15-1 may include at least one battery and the second battery group 15-2 may include at least one battery. Also, when N-number of batteries exist, at least one battery may be selected as the first battery group 15-1 and the other batteries may be selected as the second battery group 15-2 (or may be further divided into other battery groups). The first battery group 15-1 and the second battery group 15-2 may operate in different modes according to, for example, the type of emergency situation, temperatures of the batteries, discharge histories of the batteries, states of charge of the batteries, etc.

Also, in embodiments of the present invention, the battery 15 is defined as including a first dynamic battery group and a second dynamic battery group. The first dynamic battery group is defined as the battery group (e.g., the first battery group 15-1 or the second battery group 15-2) operating in the power supply mode and the second dynamic battery group is defined as the battery group (e.g., the first battery group 15-1 or the second battery group 15-2) operating in the standby mode.

The control unit 17 may assign the batteries (e.g., the battery groups) of the battery 15 to one of the first and second dynamic battery groups variously according to the type of emergency situation, the state of charge (SOC) of each of the batteries, a frequency (e.g., number of discharges) that a battery group operates in the power supply mode, the temperatures of the batteries, combinations thereof, etc. Also, the control unit 17 may change the assignment of the first or second dynamic battery group during the operation of the power supply apparatus 1.

When the supply amount of the electric energy stored in the battery group assigned to the first dynamic battery group is insufficient to support the load (e.g., insufficient in current capacity or power capacity), the electric energy stored in the battery group assigned to the second dynamic battery group operating in the standby mode may be supplied to the load (e.g., alternatively or additionally supplied).

While the electric energy stored in the first battery group 15-1 or the second battery group 15-2 assigned to the first dynamic battery group is supplied to the load, the second battery group 15-2 or the first battery group 15-1 assigned to the second dynamic battery group may be recharged (or operated in the stand-by mode).

The following examples describe possible implementations of embodiments of the present invention to further elaborate upon aspects of the present invention.

In one embodiment, when the first emergency situation occurs, the first battery group 15-1 is assigned to a first dynamic battery group to operate in a power supply mode and the second battery group 15-2 is assigned to a second dynamic battery group to operate in a standby mode. Here, under the first emergency situation, the first battery group 15-1 supplies the stored electric energy to the load. When the first emergency situation is finished, the first battery group 15-1 is recharged with electric energy.

Also, when the second emergency situation occurs, the second battery group 15-2 may be assigned to the first dynamic battery group to operate in the power supply mode and the first battery group 15-1 may be assigned to the second dynamic battery group to operate in the standby mode. Here, under the second emergency situation, the second battery group 15-2 supplies the stored electric energy to the load.

As another example, under the second emergency situation, the external power from the input terminal "in" may be transferred to the output terminal "out" via the bypass circuit 11 and concurrently (or simultaneously) the electric energy stored in the second battery group 15-2 may be supplied to the load. When the second emergency situation is finished, the second battery group 15-2 may be recharged with electric energy.

As another example, when a first emergency situation and a second emergency situation define a cycle, the operation of the battery group 15 in a first cycle and in a second cycle may be as follows.

When the first emergency situation of the first cycle occurs, the first battery group 15-1 may be assigned to the first dynamic battery group and the second battery group 15-2 may be assigned to the second dynamic battery group. When the second emergency situation of the first cycle occurs, the second battery group 15-2 may be assigned to the first dynamic battery group and the first battery group 15-1 may be assigned to the second dynamic battery group.

When the first or second emergency situation corresponding to the second cycle occurs (during which the power supply apparatus 1 normally operates after the emergency situation of the first cycle is finished), if the first emergency situation of the second cycle occurs, the second battery group 15-2 may be assigned to the first dynamic battery group and the first battery group 15-1 may be assigned to the second dynamic battery group. Also, if the second emergency situation of the second cycle occurs, the first battery group 15-1 may be assigned to the first dynamic battery group and the second battery group 15-2 may be assigned to the second battery group 15-2.

Figure 2:
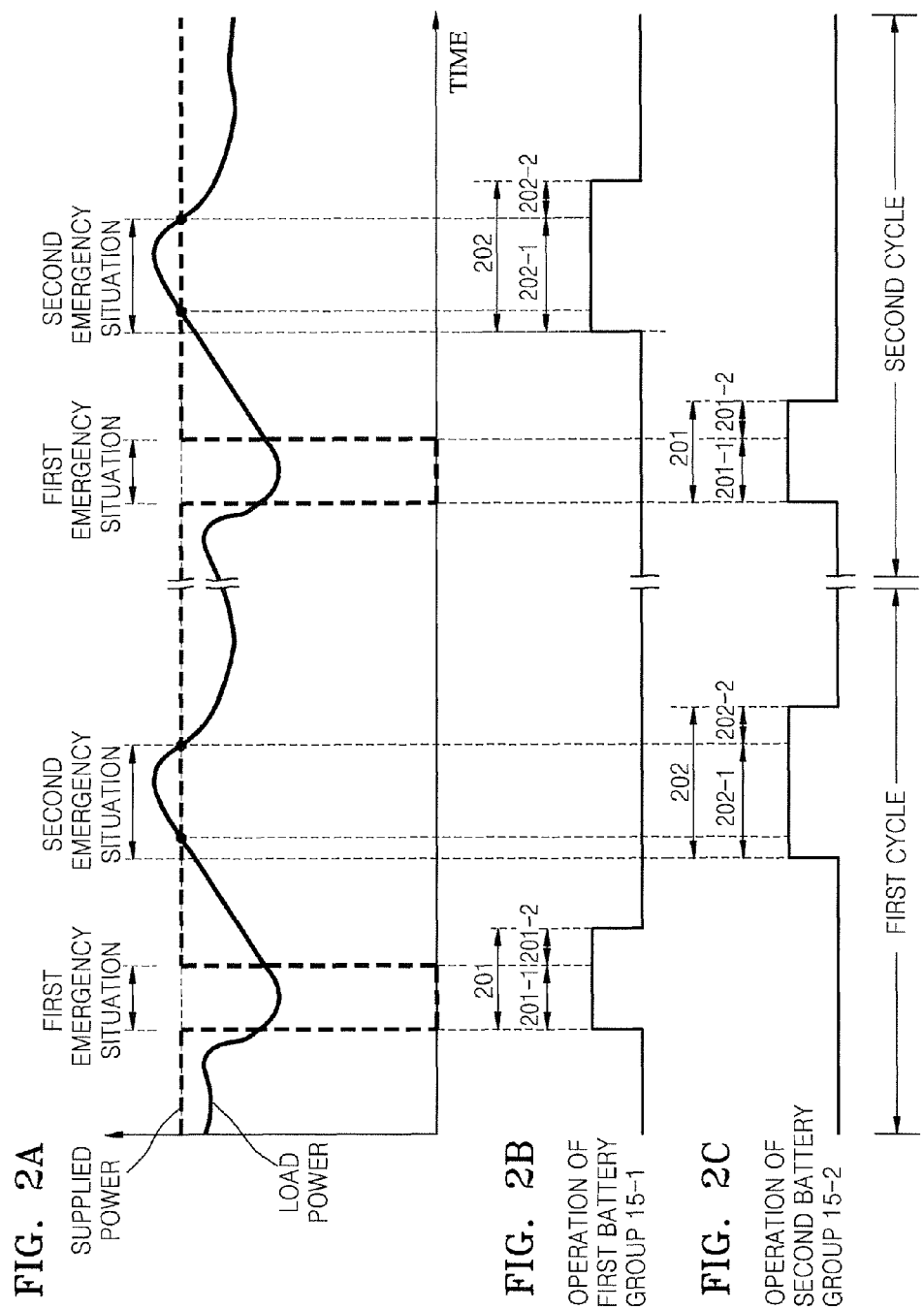
FIGS. 2A to 2C illustrate operational states of first and second battery groups according to a change in power.

Referring now to FIGS. 2A to 2C, FIGS. 2A to 2C are views illustrating operational states of the power supply apparatus 1 according to a change in power, including the first and second cycles, in which FIG. 2A illustrates a supplied power and a load power, FIG. 2B illustrates an operational state of the first battery group 15-1 under an emergency situation, and FIG. 2C illustrates an operational state of the second battery group 15-2 under an emergency situation. Although FIGS. 2A to 2C illustrate that a first emergency situation occurs first in the first and second cycles and a second emergency situation occurs later, the present invention is not limited thereto, e.g., the second emergency situation may occur first and the first emergency situation may occur later. Also, the same emergency situation may occur a plurality of times in the same single cycle.

First, the operations of the first battery group 15-1 and the second battery group 15-2 when the first or second emergency situation of the first cycle occurs are described below.

When the first emergency situation of the first cycle occurs, the first battery group 15-1 (assigned to the first dynamic battery group) operates in the power supply mode and the second battery group 15-2 (assigned to the second dynamic battery group) operates in the standby mode.

In FIG. 2B, a section 201 of the first battery group 15-1 is a section spanning a time in which a blackout occurs and when the power supply apparatus 1 is returned to a normal state. The section 201 may be divided into a section 201-1 and a section 201-2. The section 201-1 is a section in which the blackout actually occurs, and the section 201-2 is a section in which the blackout is finished and the power supply apparatus 1 is returned to a normal state. In FIG. 2B, the supply of power by the first battery group 15-1 may not be finished instantly when the section 201-1 ends, and may be gradually decreased until the power supply apparatus 1 is returned to a normal state or maintained at a normal state for a set (or predetermined) time, in the section 201-2.

When the second emergency situation of the first cycle occurs, the second battery group 15-2 (now assigned to the first dynamic battery group) operates in the power supply mode and the first battery group 15-1 (now assigned to the second dynamic battery group) operates in the standby mode.

In FIG. 2C, a section 202 of the second battery group 15-2 is a section spanning a time in which the power needed for a load exceeds (or meets or nears) the supplied power and when the power supply apparatus 1 returns to a normal state. The section 202 may be divided into a section 202-1 and a section 202-2. The section 202-1 is a section from a time point when the load power exceeds the supplied power (e.g., due to an abrupt change in the load in a particular time period) to a time point when the load power is returned to a normal state. In this case, a time point of the section 202, that is, a time point when the second emergency situation occurs, may be a time point when the supplied power matches the load power as illustrated in FIG. 2A or a time point before the time point when the supplied power matches the load power. The section 202-2 is a section in which the power supply apparatus 1 is returned to the normal state after the load power is returned to the normal state. In FIG. 2C, the supply of power by the second battery group 15-2 may not be finished instantly when the section 202-1 ends, and may be gradually decreased until the power supply apparatus 1 is returned to the normal state or maintained for a predetermined time, in the section 202-2.

Next, the operations of the first and second battery groups 15-1 and 15-2, when the first or second emergency situation of the second cycle occurs, are described.

Unlike the first cycle, when the first emergency situation of the second cycle occurs, the second battery group 15-2 operates in the power supply mode (i.e., it is assigned to the first dynamic battery group) and the first battery group 15-1 operates in the standby mode (i.e., it is assigned to the second dynamic battery group). Also, when the second emergency situation of the second cycle occurs, the first battery group 15-1 operates in the power supply mode (i.e., it is assigned to the first dynamic battery group) and the second battery group 15-2 operates in the standby mode (i.e., it is assigned to the second dynamic battery group).

The reason for switching the assignment of the first and second dynamic battery groups when the emergency situations of the first and second cycles occur is to prevent (or reduce) imbalance in the battery groups caused by the continuous operation of any one battery group in the power supply mode or the standby mode. While the embodiment described in connection with FIGS. 2A to 2C assign the battery groups in the above-described manner, in other embodiments, the assignment of the battery groups may be otherwise determined (examples of which are described below).

In one embodiment, when the first or second emergency situation occurs, states of charge (SOC) of the first and second battery groups 15-1 and 15-2 (or more) are compared with each other. According to a result of the comparison, any one of the first and second battery groups 15-1 and 15-2 having a greater SOC may be assigned to the first dynamic battery group and one having a lower SOC may be assigned to the second dynamic battery group. When the SOCs of the first and second battery groups 15-1 and 15-2 are the same, the assignment of the first and second dynamic battery groups may be determined according to the type of an emergency situation, for example, as described above. The measurement and comparison of the SOCs of the first and second battery groups 15-1 and 15-2 may be performed by the BMS 16, which is described later. Alternatively, the SOCs of the battery groups may be compared to a reference state of charge, and the assignment to the first and second dynamic battery groups may be done according to that comparison.

In one embodiment, when the first or second emergency situation occurs, the frequencies that the first and second battery groups 15-1 and 15-2 (or more) operate as the first dynamic battery group during previous emergency situations are determined (i.e., the number of prior discharge operations are determined). Then, any one of the first and second battery groups 15-1 and 15-2 having a lower frequency of operating as the first dynamic battery group may be assigned to the first dynamic battery group, whereas the other battery group may be assigned to the second dynamic battery group. Alternatively, the discharge frequencies of the battery groups may be compared to a reference discharge frequency, and the assignment to the first and second dynamic battery groups may be done according to that comparison.

In one embodiment, when the first or second emergency situation occurs, current temperatures of the first and second battery groups 15-1 and 15-2 (or more) are determined and compared with each other. Then, any one of the first and second battery groups 15-1 and 15-2 having a lower temperature may be assigned to the first dynamic battery group, whereas the other battery group may be assigned to the second dynamic battery group. Alternatively, the temperatures of the battery groups may be compared to a reference temperature, and the assignment to the first and second dynamic battery groups may be done according to that comparison.

Figure 3:
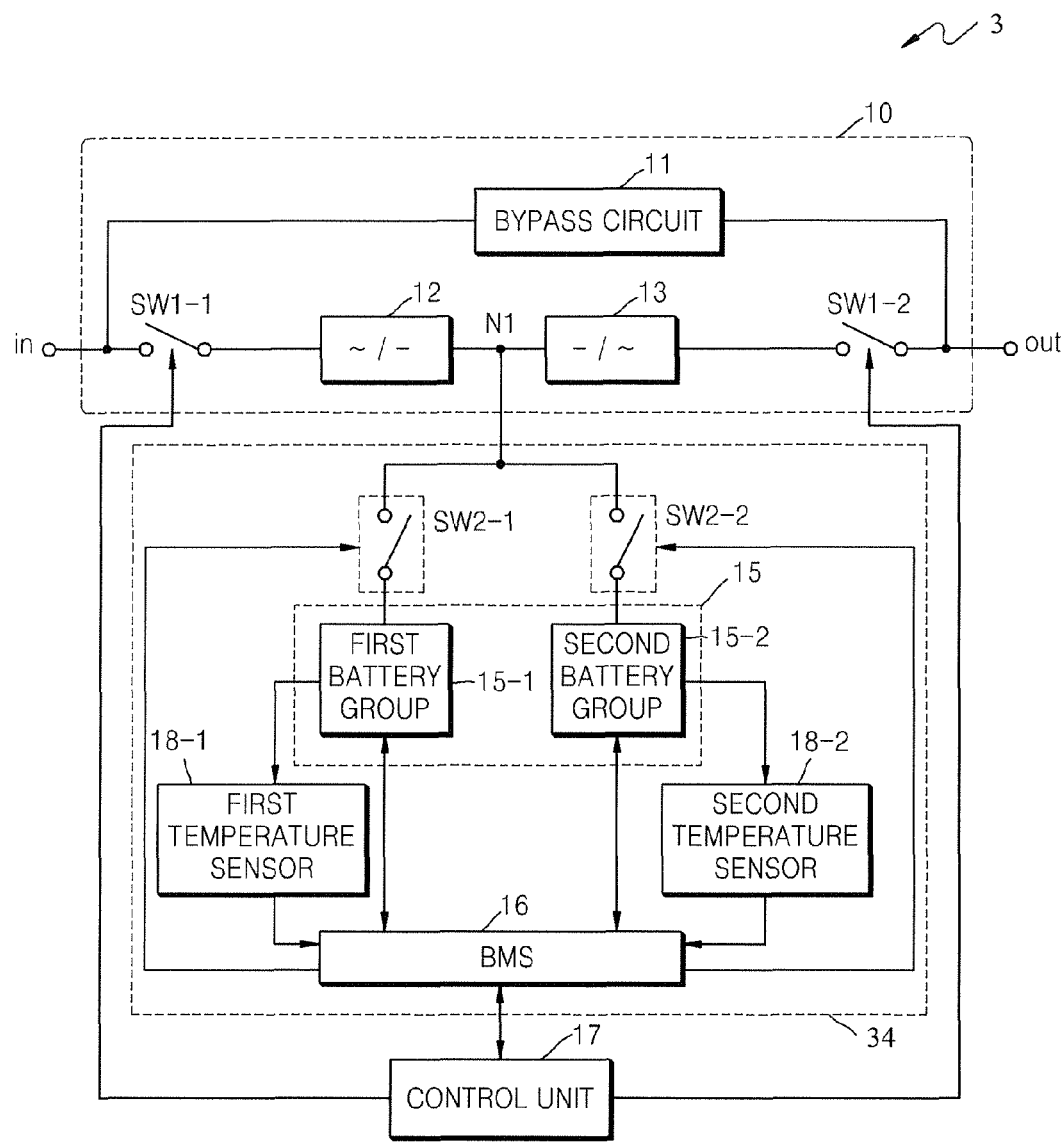
FIG. 3 is a block diagram illustrating a power supply apparatus according to another embodiment of the present invention.

Referring now to FIG. 3, FIG. 3 is a block diagram illustrating a power supply apparatus according to another embodiment of the present invention. Since the power supply according to the present embodiment may include the same (or substantially the same) structure as that described in other embodiments disclosed herein, descriptions of certain aspects of the power supply in FIG. 3 are given by way of reference to the corresponding aspects described in the other embodiments (e.g., the embodiments described in connection with FIG. 1).

In order to measure the temperatures of the first and second battery groups 15-1 and 15-2, a first temperature sensor 18-1 and a second temperature sensor 18-2 may be included in a battery pack 34. The first and second temperature sensors 18-1 and 18-2 may be thermistors, but are not limited thereto.

Referring now back to FIG. 1, the third switching element SW2-1 may selectively couple the first node N1 to the first battery group 15-1 to store electric energy in the first battery group 15-1 or to discharge electric energy from the first battery group 15-1. When the third switching element SW2-1 is in an ON state and an emergency situation is occurring, the electric energy stored in the first battery group 15-1 may be supplied to the second power conversion unit 13. After the emergency situation is finished, the third switching element SW2-1 may be switched to an OFF state. When the third switching element SW2-1 is in the ON state and an emergency situation is not occurring, the first battery group 15-1 may be recharged with the first DC power from the first power conversion unit 12. The ON/OFF operations of the third switching element SW2-1 may be controlled by the BMS 16.

The fourth switching element SW2-2 may selectively couple the first node N1 to the second battery group 15-2 to store electric energy in the second battery group 15-2 or to discharge electric energy from the second battery group 15-2. When the fourth switching element SW2-2 is in an ON state and an emergency situation is occurring, the electric energy stored in the second battery group 15-2 may be supplied to the second power conversion unit 13. After the second emergency situation is finished, the fourth switching element SW2-2 may remain in (or be switched back into) an ON state so that the first battery group 15-1 may be recharged with the first DC power from the first power conversion unit 12. The ON/OFF operations of the fourth switching element SW2-2 may be controlled by the BMS 16.

The BMS 16 controls charge and discharge of the battery 15. Additionally, the BMS 16 may operate as a protection circuit. The BMS 16 may include an analog front end (AFE) (not shown) for sensing a voltage, a current, and/or a temperature of the each of the batteries of battery 15, and a microcomputer (not shown) for controlling an operation of the AFE and transferring data to the control unit 17 or an external monitoring apparatus (not shown). The BMS 16 may perform sensing and communication operations when the battery 15 performs a charge or discharge operation, and may perform sensing and communication operations when the battery 15 is in a normal state.

Also, the BMS 16 may output a switching control signal for switching the third switching element SW2-1 or the fourth switching element SW2-2 according to, for example, the type of emergency situation, the statuses of the battery groups, or combinations thereof. For example, as described above in connection with an embodiment, when receiving a signal indicating the occurrence of the first emergency situation from the control unit 17, the BMS 16 may output a control signal to turn the third switching element SW2-1 on. Additionally, in this example, when receiving a signal indicating the occurrence of the second emergency situation from the control unit 17, the BMS 16 may output a control signal to turn the fourth switching element SW2-2 on. Here, when receiving a signal indicating the termination of the first or second emergency situation from the control unit 17, the BMS 16 may turn the third or fourth switching element SW2-1 or SW2-2 on to charge the first or second battery group 15-1 or 15-2.

As another example, the BMS 16 may determine and output a switching control signal for switching the third or fourth switching element SW2-1 or SW2-2 by measuring and comparing: the SOCs, the number of discharges, the temperatures, etc. of the first and second battery groups 15-1 and 15-2 (e.g., comparing with each other or to a reference value). The BMS 16 may concurrently (or simultaneously) turn the third and fourth switching elements SW2-1 and SW2-2 on or off, or turn one switching element on while turning the other switching element off.

The control unit 17 may control an operation of each of the elements of the power supply apparatus 1. In one embodiment, the controller 17 controls the ON/OFF operations of the first and second switching elements SW1-1 and SW1-2. For example, when the SOC of the battery 15 is small, the control unit 17 supplies electric power by turning the first switching element SW1-1 on to charge the battery 15. As another example, when an emergency situation occurs, the control unit 17 turns the second switching element SW1-2 on so that the electric energy stored in the battery 15 may be supplied to the load.

The control unit 17 may sense an abnormal state of the external power source and, when an emergency situation occurs, may control the power supply apparatus 1 to operate as an uninterruptible power supply (UPS). In other words, the control unit 17 may control the external power to be transferred to the load in a normal state, in which the external power source supplies electric power to the load, and may control the power supply circuit 10 to generate an operation power for the BMS 16 by using the external power. Also, when a blackout occurs (e.g., a blackout caused by a malfunction of the external power source) or an overload occurs (e.g., when the supplied power exceeds a maximum supplied power for a particular time period), the control unit 17 may control the power supply circuit 10 to generate electric power to be supplied to the load and to the operation power of the BMS 16 by using the electric energy stored in the battery 15.

Alternatively, in another embodiment, the BMS 16 is configured to additionally operate as the control unit 17.

Methods of controlling a power supply apparatus according to embodiments of the present invention are described below.

Figure 4A:
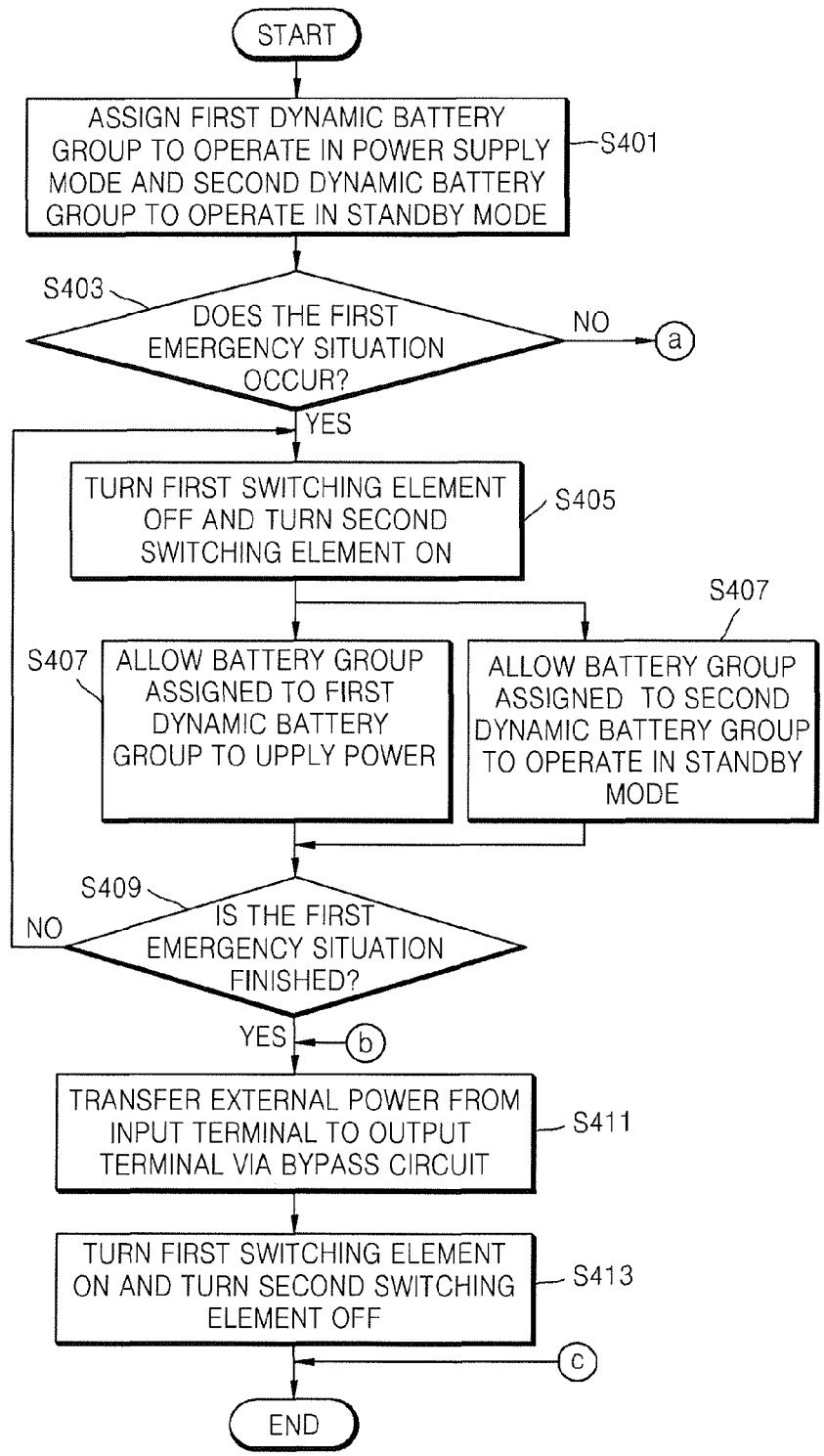
FIGS. 4A to 4B are flowcharts showing a method of controlling a power supply apparatus according to an embodiment of the present invention.
Figure 4B:
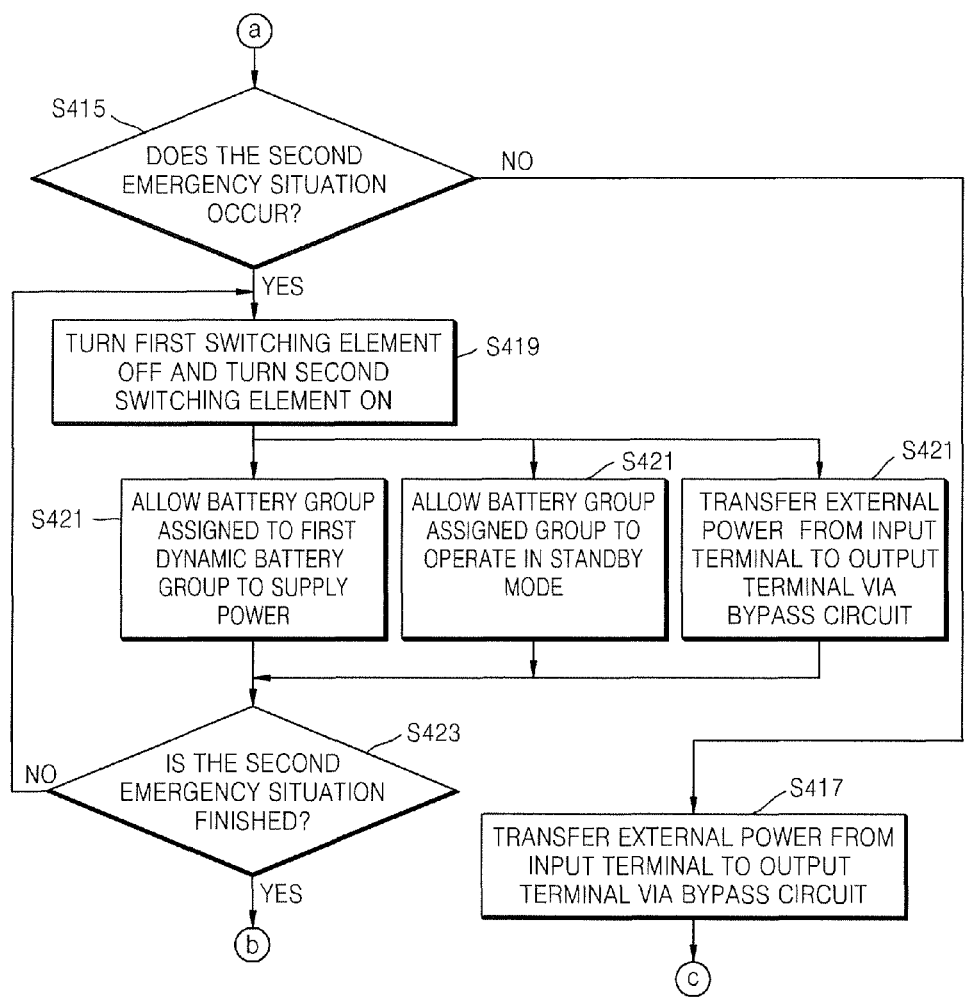

FIGS. 4A and 4B are flowcharts showing a method of controlling the power supply apparatus 1 according to an embodiment of the present invention.

Referring to FIG. 4A, the control unit 17 selects at least one of a plurality of batteries (e.g., the first and second battery groups 15-1 and 15-2) as the first dynamic battery group and the other batteries as the second dynamic battery group, and then assigns the first dynamic battery group to operate in the power supply mode and the second dynamic battery group to operate in the standby mode (S401).

When the assignment of the first and second dynamic battery groups is completed, the control unit 17 may determine whether or not the first emergency situation occurs (the first emergency situation may be defined as when a blackout is caused due to the malfunction of the external power or overload) (S403). In other embodiments, the control unit 17 may assign the dynamic battery groups after the type of emergency situation is determined or may do both operations concurrently.

When the first emergency situation occurs, the control unit 17 turns the first switching element SW1-1 off and the second switching element SW1-2 on (S405). When the first switching element SW1-1 is turned off and the second switching element SW1-2 is turned on, the electric energy stored in the battery 15 is output to the output terminal "out" via the second power conversion unit 13. Also, the control unit 17 controls the BMS 16 to operate the battery 15 in the power supply mode and the standby mode.

When the first emergency situation occurs, the BMS 16 under the control of the control unit 17 controls the operation of the third switching element SW2-1 and the fourth switching element SW2-2 so that the first dynamic battery group (e.g., the first battery group 15-1 or the second battery group 15-2) supplies power and the second dynamic battery group (e.g., the first battery group 15-1 or the second battery group 15-2) operates in the standby mode (S407). For example, when the first battery group 15-1 is assigned to the first dynamic battery group, SW2-1 is turned on so that the electric energy stored in the first battery group 15-1 can be converted to the first AC power by the second power conversion unit 13 and then outputted to the output terminal "out".

Then, the control unit 17 determines whether or not the first emergency situation is finished (S409). In other words, the control unit 17 determines whether or not the external power source is in a normal state.

When the first emergency situation is finished, the control unit 17 transfers the external power from the input terminal "in" to the output terminal "out" via the bypass circuit 11 (S411).

Thereafter, the control unit 17 turns the first switching element SW1-1 on and the second switching element SW1-2 off (S413). When the first switching element SW1-1 is turned on and the second switching element SW1-2 is turned off, the external power from the input terminal "in" is converted to the first DC power by the first power conversion unit 12 and is then used to recharge the first dynamic battery group. In this state, the third switching element SW2-1 and/or the second switching element SW2-2 is turned on to supply the first DC power to recharge the discharged battery group (i.e., the first battery group 15-1 and/or the second battery group 15-2).

In the present embodiment, operations S411 and S413 may be concurrently (or simultaneously) performed. In other words, when the first emergency situation is finished, the external power from the input terminal "in" may be transferred to the output terminal "out" via the bypass circuit 11, and concurrently, the power supply apparatus 1 may be returned to a normal state. In this state, the control unit 17 turns the first switching element SW1-1 on and the second switching element SW1-2 off so that the external power from the input terminal "in" is converted to the first DC power by the first power conversion unit 12. Accordingly, the first battery group 15-1 or the second battery group 15-2 assigned to the first dynamic battery group may be recharged with the first DC power.

As illustrated in FIG. 4B, if the first emergency situation did not occur, and when the external power source is in a normal state and the external power is supplied to the load, the control unit 17 determines whether or not the second emergency situation occurs, which may be defined as a case just before a blackout is caused (e.g., because a load power exceeds a supplied power due to an abrupt change in the load in a particular time period, or a load power surpasses a reference value) (S415).

When the first and second emergency situations do not occur, the control unit 17 transfers the external power from the input terminal "in" to the output terminal "out" via the bypass circuit 11 (S417) (or may remain in that state if already there).

However, when the second emergency situation occurs, the control unit 17 turns the first switching element SW1-1 off and the second switching element SW1-2 on (S419). When the first switching element SW1-1 is turned off and the second switching element SW1-2 is turned on, the electric energy stored in the battery 15 is output to the output terminal "out" via the second power conversion unit 13. Also, the control unit 17 controls the BMS 16 to operate the battery groups in the power supply mode or the standby mode.

When the second emergency situation occurs, the BMS 16 under the control of the control unit 17 controls the third switching element SW2-1 and the fourth switching element SW2-2 so that the first dynamic battery group may supply power and the second dynamic battery group may operate in the standby mode while the external power from the input terminal "in" may be transferred to the output terminal "out" via the bypass circuit 11 (S421). For example, when the second battery group 15-2 is assigned to the first dynamic battery group, SW2-2 is turned on so that the electric energy stored in the second battery group 15-2 is converted to the first AC power by the second power conversion unit 13 and then it is output to the output terminal "out," and concurrently, the external power from the input terminal "in" may be output to the output terminal "out" via the bypass circuit 11. In another embodiment, the bypass circuit may be open and the external power may be converted by the first power conversion unit 12 and combined with the battery power to also be converted to the first AC power by the second conversion unit 13 before being output to the output terminal "out."

Then, the control unit 17 determines whether or not the second emergency situation is finished (S423). In other words, the control unit 17 determines whether or not the external power source is in a normal state and is switched to a state of supplying the external power to the load.

When the second emergency situation is finished, the control unit 17 turns the first switching element SW1-1 and the second switching element SW1-2 off, transfers the external power from the input terminal "in" to the output terminal "out" via the bypass circuit 11, and then, turns the first switching element SW1-1 on and the second switching element SW1-2 off. Accordingly, operations S411 and S413 in which the second battery group 15-2 is recharged are performed. Also, operations S411 and S413 may be concurrently (or simultaneously) performed. Since the subsequent processes have already been described above, detailed descriptions thereof are given by way of reference thereto.

FIG. 5 is a flowchart showing a method of controlling the power supply apparatus 1 according to another embodiment of the present invention.

Referring to FIG. 5, the control unit 17 determines whether or not the first or second emergency situation occurs (S501).

When the first or second emergency situation does not occur, the control unit 17 transfers the external power from the input terminal "in" to the output terminal "out" via the bypass circuit 11 (S503). When the first or second emergency situation occurs, the control unit 17 turns the first switching element SW1-1 off and the second switching element SW1-2 on (S505). When the first switching element SW1-1 is turned off and the second switching element SW1-2 is turned on, the electric energy stored in the battery 15 is output to the output terminal "out" via the second power conversion unit 13. Also, the control unit 17 controls the BMS 16 to operate the battery groups in the power supply mode and the standby mode.

When the first or second emergency situation occurs, the BMS 16 under the control of the control unit 17 checks and compares the states of charge (SOCs) of the first and second battery groups 15-1 and 15-2 with each other (S507).

The controller receiving a result of the comparison from the BMS 16 assigns any one of the first and second battery groups 15-1 and 15-2 having a larger SOC to the first dynamic battery group to supply power and the one having a smaller SOC to the second dynamic battery group to operate in the standby mode (S509). The third or fourth switching element SW2-1 or SW2-2 is selectively turned on according to which battery group is in the power supply mode. The electric energy stored in the first or second battery group 15-1 or 15-2 assigned to the first dynamic battery group is converted to the first AC power by the second power conversion unit 13 and is output to the output terminal "out". As a result of the comparison, if the SOCs of the first and second battery groups 15-1 and 15-2 are the same, any one of the first and second dynamic battery groups 15-1 and 15-2 may be assigned to the first dynamic battery group according to the type of an emergency situation.

Then, the control unit 17 determines whether or not the first or second emergency situation is finished (S511). In other words, the control unit 17 determines whether or not the external power source is in a normal state and the external power is supplied to the load.

When the first or second emergency situation is finished, the control unit 17 transfers the external power from the input unit "in" to the output terminal "out" via the bypass circuit 11 (S513).

After transferring the external power from the input unit "in" to the output terminal "out" via the bypass circuit 11, the control unit 17 turns the first switching element SW1-1 on and the second switching element SW1-2 off (S515). When the first switching element SW1-1 is turned on and the second switching element SW1-2 is turned off, the external power from the input unit "in" is converted to the first DC power by the first power conversion unit 12 and is used to recharge the first or second battery group 15-1 or 15-2 that was operated as the first dynamic battery group.

In the present embodiment, operations S513 and S515 may be concurrently (or simultaneously) performed. In other words, when the emergency situation is finished, the power supply apparatus 1 is returned to a normal state. In this state, the control unit 17 transfers the external power from the input unit "in" to the output terminal "out" via the bypass circuit 11, and concurrently (or simultaneously), turns the first switching element SW1-1 on and the second switching element SW1-2 off, so that the external power from the input terminal "in" may be converted to the first DC power by the first power conversion unit 12 and then used to recharge the battery group that operated in the power supply mode.

Figure 6:
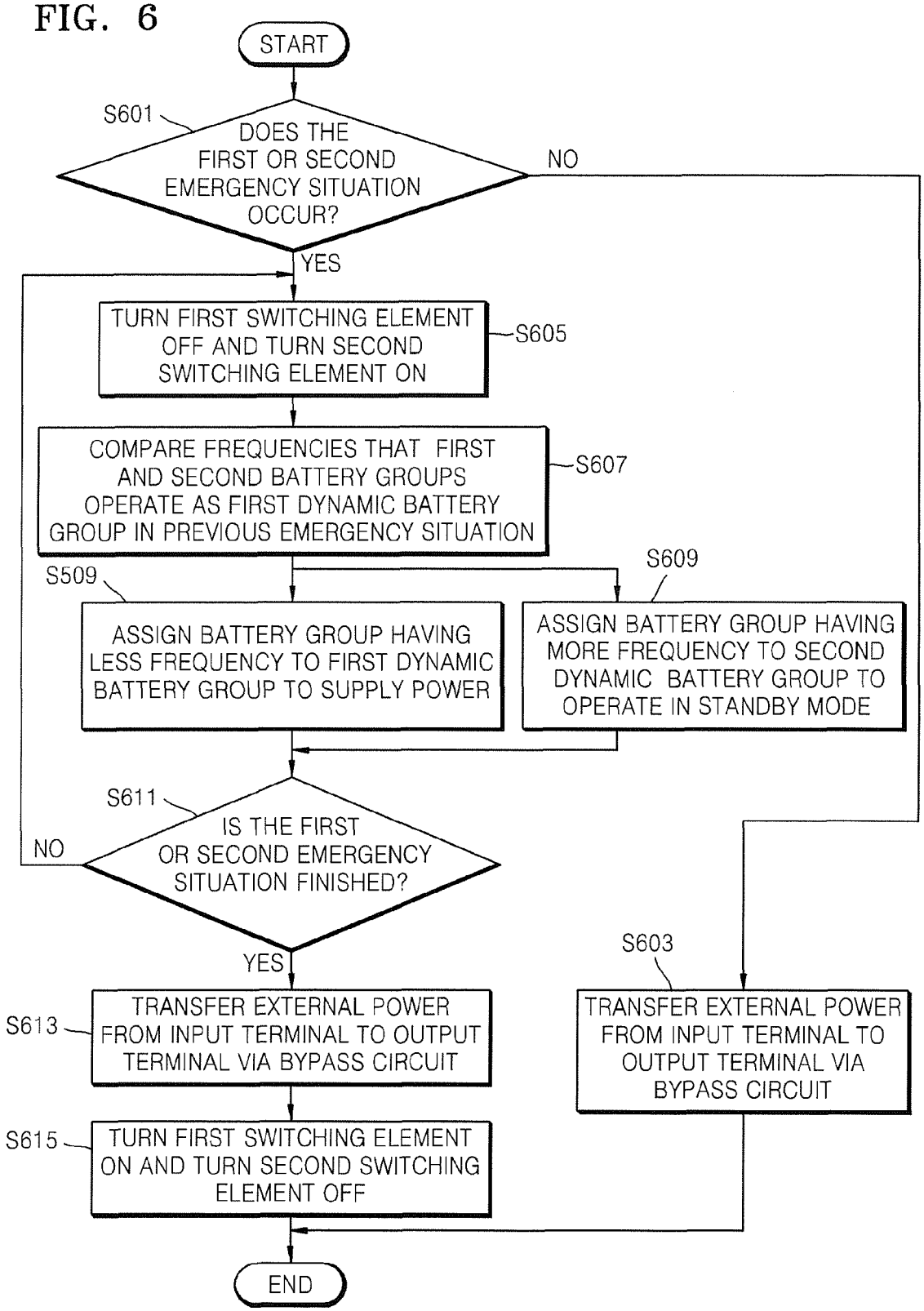
FIG. 6 is a flowchart showing a method of controlling a power supply apparatus according to another embodiment of the present invention.

FIG. 6 is a flowchart showing a method of controlling the power supply apparatus 1, according to another embodiment of the present invention.

Referring to FIG. 6, the control unit 17 determines whether or not the first or second emergency situation occurs (S601).

When the first or second emergency situation does not occur, the control unit 17 transfers the external power from the input terminal "in" to the output terminal "out" via the bypass circuit 11 (S603).

However, when the first or second emergency situation occurs, the control unit 17 turns the first switching element SW1-1 off and the second switching element SW1-2 on (S605). When the first switching element SW1-1 is turned off and the second switching element SW1-2 is turned on, the electric energy stored in the battery 15 is output to the output terminal "out" via the second power conversion unit 13. Also, the control unit 17 controls the BMS 16 to operate the battery groups in the power supply mode or the standby mode.

When the first or second emergency situation occurs, the BMS 16 under the control of the control unit 17 compares the frequencies that the first and second battery groups 15-1 and 15-2 operate as the first dynamic battery group during a previous emergency situation (e.g., determines the number of discharges for each battery group) (S607).

The control unit 17 assigns any one of the first and second battery groups 15-1 and 15-2 having a lower frequency of operating as the first dynamic battery group during the previous emergency situations to the first dynamic battery group to supply power and the one having a greater frequency of operating as the first dynamic battery group to the second dynamic battery group to operate in the standby mode (S609). The third or fourth switching element SW2-1 or SW2-2 is turned on to operate the appropriate battery group in the power supply mode. When the frequencies that the first and second battery groups 15-1 and 15-2 operate as the first dynamic battery group during the previous emergency situations are the same, any one of the first and second battery groups 15-1 and 15-2 may be assigned to the first dynamic battery group according to the type of an emergency situation. The electric energy stored in the first or second battery group 15-1 or 15-2 assigned to the first dynamic battery group is converted to the first AC power by the second power conversion unit 13 and is output to the output terminal "out".

Then, the control unit 17 determines whether or not the first or second emergency situation is finished (S611). In other words, the control unit 17 determines whether or not the external power source is in a normal state and the external power is supplied to the load.

When the first or second emergency situation is finished, the control unit 17 transfers the external power from the input unit "in" to the output terminal "out" via the bypass circuit 11 (S613).

After transferring the external power from the input unit "in" to the output terminal "out" via the bypass circuit 11, the control unit 17 turns the first switching element SW1-1 on and the second switching element SW1-2 off (S615). When the first switching element SW1-1 is turned on and the second switching element SW1-2 is turned off, the external power from the input unit "in" is converted to the first DC power by the first power conversion unit 12 and is used to recharge the battery group operated in the power supply mode.

In the present embodiment, operations S613 and S615 may be concurrently (or simultaneously) performed. In other words, when the emergency situation is finished, the power supply apparatus 1 is returned to a normal state. In this state, the control unit 17 transfers the external power from the input unit "in" to the output terminal "out" via the bypass circuit 11, and concurrently (or simultaneously), turns the first switching element SW1-1 on and the second switching element SW1-2 off, so that the external power from the input terminal "in" may be converted to the first DC power by the first power conversion unit 12 and then used to recharge the battery group operating in the power supply mode.

Figure 7:
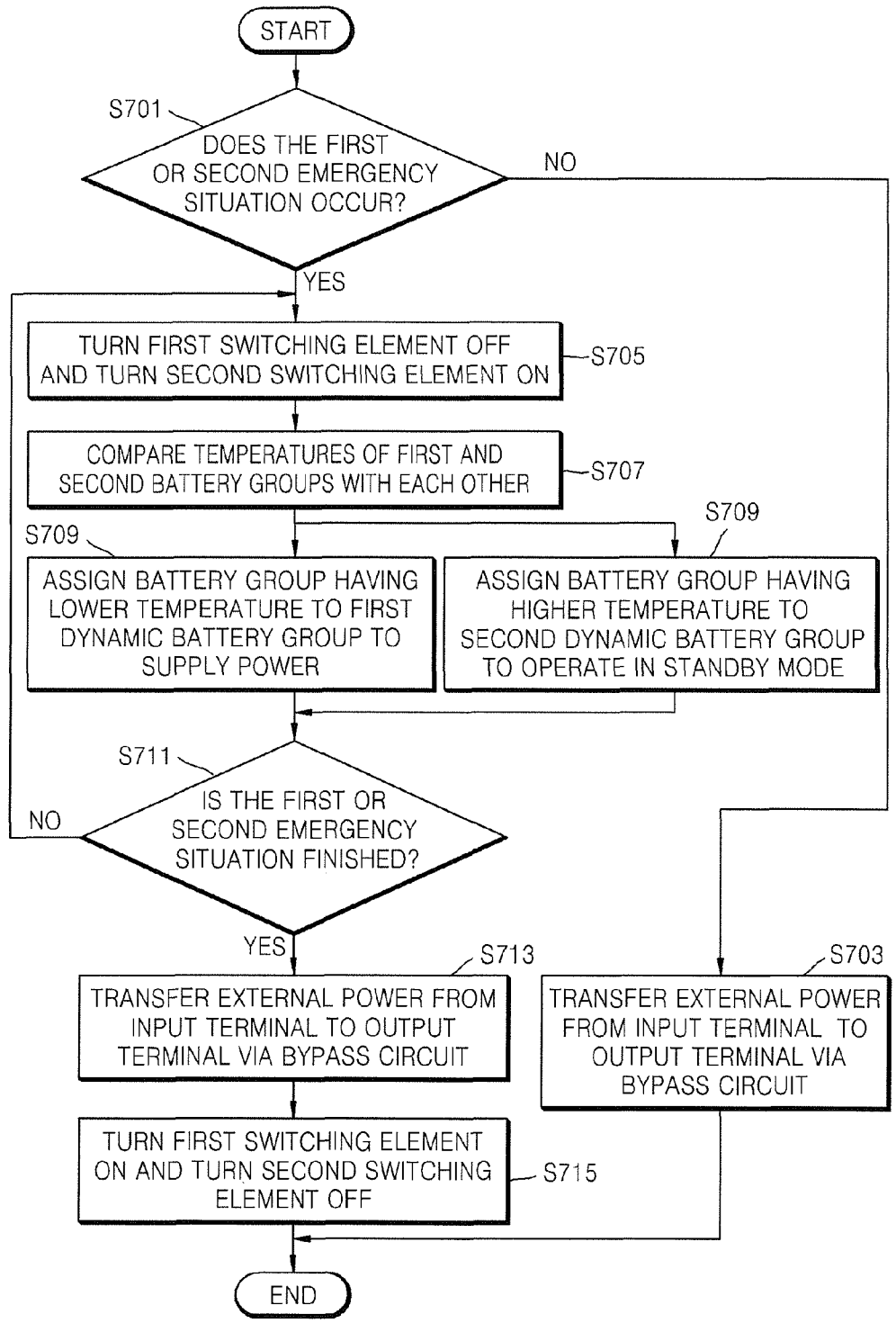
FIG. 7 is a flowchart showing a method of controlling a power supply apparatus according to another embodiment of the present invention.

FIG. 7 is a flowchart showing a method of controlling the power supply apparatus 1, according to another embodiment of the present invention.

Referring to FIG. 7, the control unit 17 determines whether or not the first or second emergency situation occurs (S701).

When the first or second emergency situation does not occur, the control unit 17 transfers the external power from the input terminal "in" to the output terminal "out" via the bypass circuit 11 (S703).

However, when the first or second emergency situation occurs, the control unit 17 turns the first switching element SW1-1 off and the second switching element SW1-2 on (S705). When the first switching element SW1-1 is turned off and the second switching element SW1-2 is turned on, the electric energy stored in the battery 15 is output to the output terminal "out" via the second power conversion unit 13. Also, the control unit 17 controls the BMS 16 to operate the battery groups in the power supply mode or the standby mode.

When the first or second emergency situation occurs, the BMS 16 under the control of the control unit 17 compares the temperatures of the first and second battery groups 15-1 and 15-2 (S707).

The control unit 17 receiving a result of the comparison from the BMS 16 assigns any one of the first and second battery groups 15-1 and 15-2 having a lower temperature to the first dynamic battery group to supply power and the one having a higher temperature to the second dynamic battery group to operate in the standby mode (S709). The third or fourth switching element SW2-1 or SW2-2 is turned on to operate the appropriate battery group in the power supply mode. When the temperatures of the first and second battery groups 15-1 and 15-2 are the same, any one of the first and second battery groups 15-1 and 15-2 may be assigned to the first dynamic battery group according to the type of an emergency situation. The electric energy stored in the first or second battery group 15-1 or 15-2 assigned to the first dynamic battery group is converted to the first AC power by the second power conversion unit 13 and is output to the output terminal "out".

Then, the control unit 17 determines whether or not the first or second emergency situation is finished (S711). In other words, the control unit 17 determines whether or not the external power source is in a normal state and the external power is supplied to the load.

When the first or second emergency situation is finished, the control unit 17 transfers the external power from the input unit "in" to the output terminal "out" via the bypass circuit 11 (S713).

After transferring the external power from the input unit "in" to the output terminal "out" via the bypass circuit 11, the control unit 17 turns the first switching element SW1-1 on and the second switching element SW1-2 off (S715). When the first switching element SW1-1 is turned on and the second switching element SW1-2 is turned off, the external power from the input unit "in" is converted to the first DC power by the first power conversion unit 12 and is used to recharge the battery group 15-1 operating in the power supply mode.

In the present embodiment, operations S713 and S715 may be concurrently (or simultaneously) performed. In other words, when the emergency situation is finished, the power supply apparatus 1 is returned to a normal state. In this state, the control unit 17 transfers the external power from the input unit "in" to the output terminal "out" via the bypass circuit 11, and concurrently (or simultaneously), turns the first switching element SW1-1 on and the second switching element SW1-2 off, so that the external power from the input terminal "in" may be converted to the first DC power by the first power conversion unit 12 and then used to recharge the battery group operating in the power supply mode.

Figure 8:
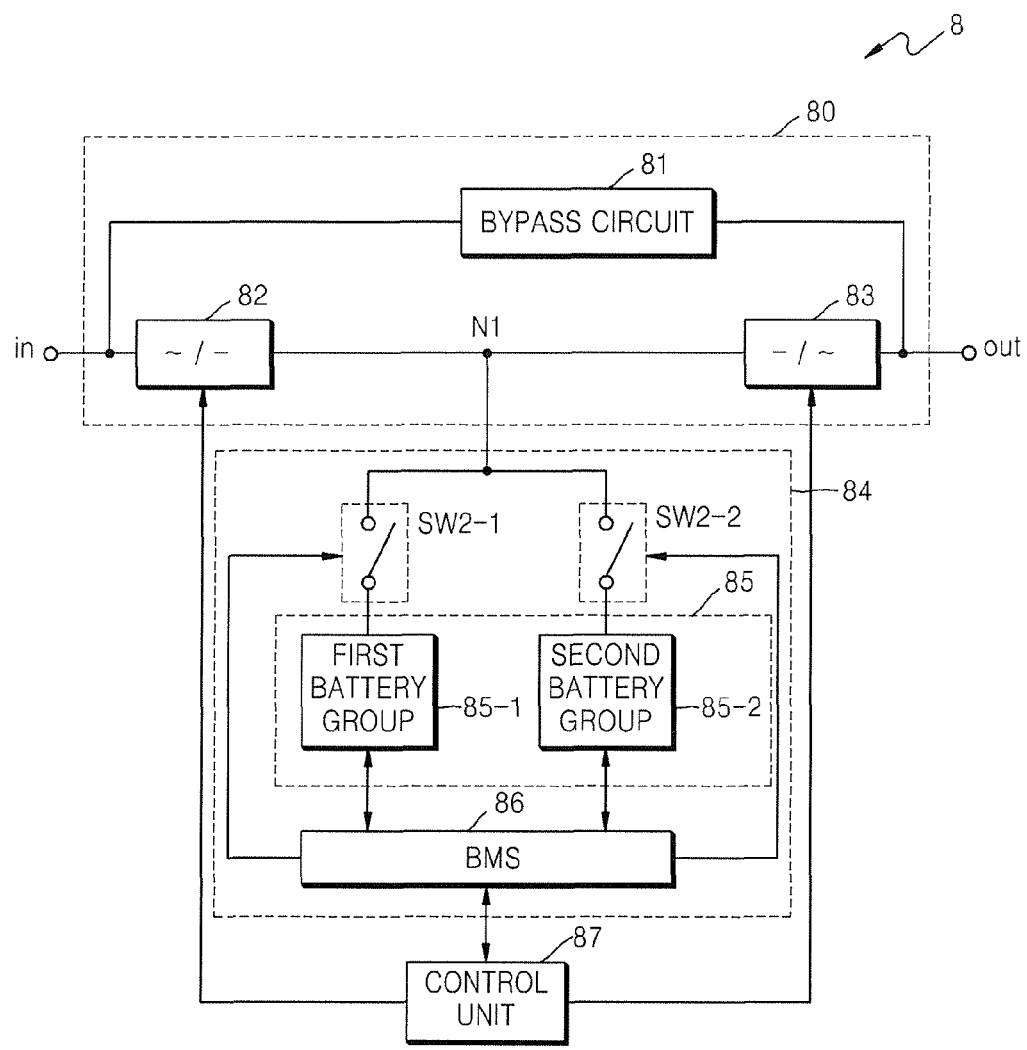
FIG. 8 is a block diagram illustrating a power supply apparatus according to another embodiment of the present invention.

FIG. 8 is a block diagram illustrating a power supply apparatus 8 according to another embodiment of the present invention.

Referring to FIG. 8, the power supply apparatus 8 according to the present embodiment includes a power supply circuit 80, a battery pack 84, and a control unit 87. Also, the power supply apparatus 8 includes an input terminal "in" and an output terminal "out".

The power supply circuit 80 according to the present embodiment includes a bypass circuit 81, a first power conversion unit 82, and a second power conversion unit 83. In other words, the power supply circuit 80 is substantially the same as the power supply circuit 10 of FIG. 1, but with the first and second switching elements SW1-1 and SW1-2 removed. The control unit 87 controls the operations of the first and second power conversion units 82 and 83 instead of controlling the ON/OFF of the first and second switching elements SW1-1 and SW1-2 and, if necessary, controls the power applied to input terminals of the first and second power conversion units 82 and 83 to be converted to AC or DC and output to output terminals thereof.

When a battery 85 needs to be recharged due to an insufficient remaining capacity, the control unit 87 controls the first power conversion unit 82 to supply a first DC power to the battery 85. Also, when an emergency situation occurs, the control unit 87 controls the second power conversion unit 83 to generate power to be supplied to a load and an operation power of a BMS 86 by using electric energy stored in the battery 85. Also, although it is not illustrated in the drawing, the battery pack 84 may include a temperature sensor for measuring a temperature of the battery 85. Since the other elements are the same as (or substantially similar to) those illustrated in FIG. 1, detailed descriptions thereof are given by way of reference thereto.

Figure 9:
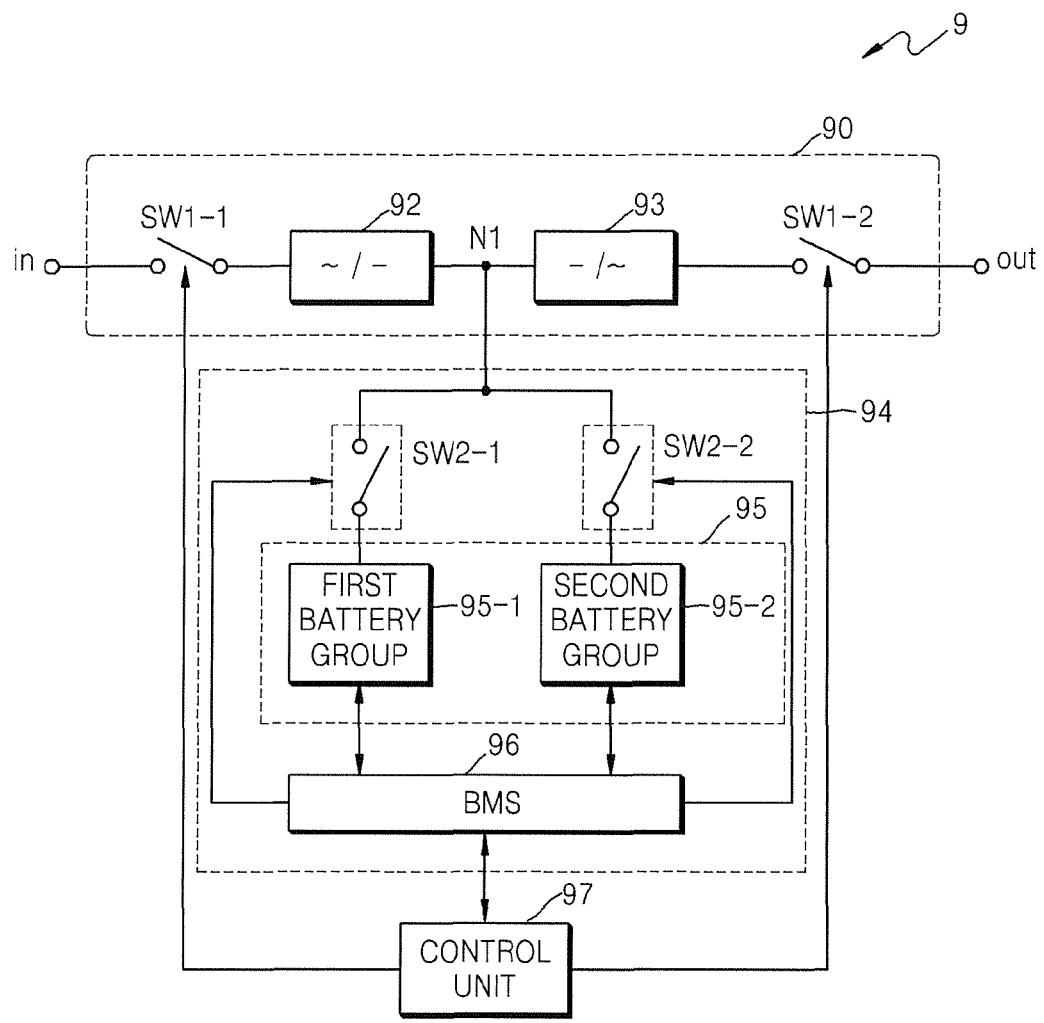
FIG. 9 is a block diagram illustrating a power supply apparatus according to another embodiment of the present invention.

FIG. 9 is a block diagram illustrating a power supply apparatus 9 according to another embodiment of the present invention.

Referring to FIG. 9, the power supply apparatus 9 according to the present embodiment includes a power supply circuit 90, a battery pack 94, and a control unit 97. Also, the power supply apparatus 9 includes an input terminal "in" and an output terminal "out".

The power supply circuit 90 according to the present embodiment includes a first power conversion unit 92, and a second power conversion unit 93. In other words, the power supply circuit 90 according to the present embodiment is substantially the same as the power supply circuit 10 of FIG. 1, but with the bypass circuit 11 removed. The control unit 97 controls the ON/OFF of the switching elements and the operations of the first and second power conversion units 92 and 93 and, if necessary, controls the power applied to input terminals of the first and second power conversion units 92 and 93 to be converted to AC or DC and output to output terminals thereof.

When a battery 95 needs to be recharged due to an insufficient remaining capacity, the control unit 97 controls the first power conversion unit 92 to operate by turning the first switching element SW1-1 on so that a first DC power may be supplied to the battery 95. Also, when an emergency situation occurs, the control unit 97 controls the second power conversion unit 93 to operate by turning the second switching element SW1-2 on so that power to be supplied to a load and an operation power of a BMS 96 may be generated by using electric energy stored in the battery 95. Also, in a normal state, the control unit 97 turns both of the first and second switching elements SW1-1 and SW1-2 on so as to transfer the external power from the input terminal "in" to the output terminal "out" via the first and second power conversion units 92 and 93. Also, although it is not illustrated in the drawing, the battery pack 94 may include a temperature sensor for measuring a temperature of the battery 95. Since the other elements are the same as (or substantially similar to) those illustrated in FIG. 1, detailed descriptions thereof are given by way of reference thereto.

Figure 10:
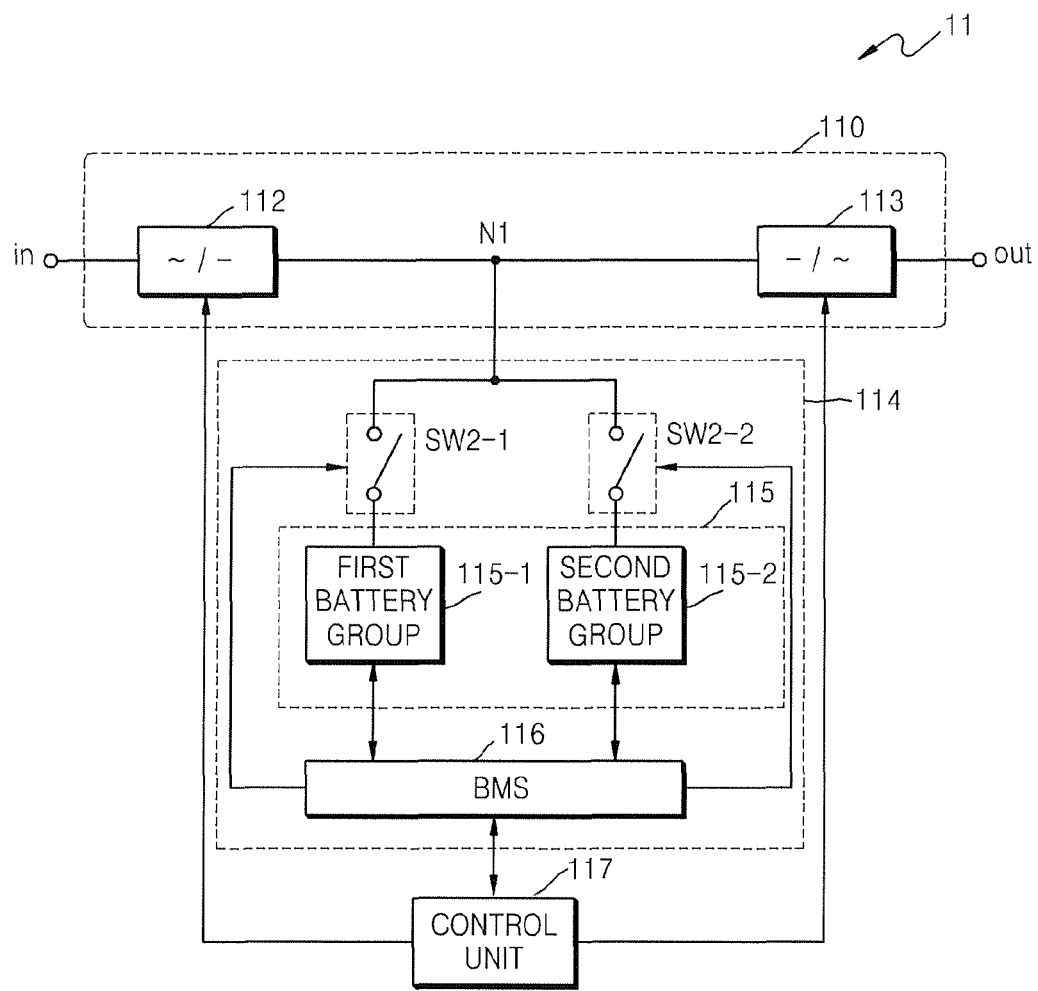
FIG. 10 is a block diagram illustrating a power supply apparatus according to another embodiment of the present invention.

FIG. 10 is a block diagram illustrating a power supply apparatus 11 according to another embodiment of the present invention.

Referring to FIG. 10, the power supply apparatus 11 according to the present embodiment includes a power supply circuit 110, a battery pack 114, and a control unit 117. Also, the power supply apparatus 11 includes an input terminal "in" and an output terminal "out".

The power supply circuit 110 according to the present embodiment includes a first power conversion unit 112, and a second power conversion unit 113. In other words, the power supply circuit 110 according to the present embodiment is substantially the same as the power supply circuit 80 of FIG. 8, but with the bypass circuit 81 removed. The control unit 117 controls the operations of the first and second power conversion units 112 and 113 instead of controlling the ON/OFF of the switching elements and, if necessary, controls the power applied to input terminals of the first and second power conversion units 112 and 113 to be converted to AC or DC and output to output terminals thereof.

When a battery 115 needs to be recharged due to an insufficient remaining capacity, the control unit 117 controls the first power conversion unit 112 to operate so that a first DC power may be supplied to the battery 115. Also, when an emergency situation occurs, the control unit 117 controls the second power conversion unit 113 to operate so that power to be supplied to a load and an operation power of a BMS 116 may be generated by using electric energy stored in the battery 115. Also, in a normal state, the control unit 117 may transfer the external power from the input terminal "in" to the output terminal "out" via the first and second power conversion units 112 and 113. Also, although it is not illustrated in the drawing, the battery pack 114 may include a temperature sensor for measuring a temperature of the battery 115. Since the other elements are the same as (or substantially similar to) those illustrated in FIG. 1, detailed descriptions thereof are given by way of reference thereto.

A program for executing the controlling methods according to the above-described embodiments and modified examples thereof in the power supply apparatuses 1, 3, 8, 9, and 10 may be stored in a recording medium. The recording medium may be, for example, a medium that may be read by a processor and a semiconductor recording medium, for example, a flash memory, may be used therefor. The medium may be read by a processor and executed by the processor.

While this invention has been particularly shown and described with reference to particular embodiments thereof, it will be understood by those skilled in the art that various changes in form and details may be made therein without departing from the spirit and scope of the invention as defined by the appended claims (and equivalents thereof). The described embodiments should be considered in descriptive sense only and not for purposes of limitation. Therefore, the scope of the invention is defined not by the detailed description of the invention but by the appended claims (and equivalents thereof), and all differences within the scope will be construed as being included in the present invention.

All documents including a published document, a patent application, a patent, etc. that are cited in the present application may be combined in the present invention in the same way as one that each cited document indicates individually and in combination with the present invention in detail or one that the cited documents indicate in combination with the present invention as a whole.

LIST OF REFERENCE NUMERALS 1, 3, 8, 9, 10: power supply apparatus
10, 80, 90, 110: power supply circuit
11, 81: bypass circuit
12, 82, 92, 112: first power conversion unit
13, 83, 93, 113: second power conversion unit
14, 34 84, 94, 114: battery pack
15, 85, 95, 115: battery
15-1, 85-1, 95-1, 115-1: first battery group
15-2, 85-2, 95-2, 115-2: second battery group
16, 86, 96, 116: battery management system
17, 87, 97, 117: control unit
18-1: first temperature sensor
18-2: second temperature sensor

What is claimed is:
1. A power supply comprising:
a power supply circuit configured to receive a first power from an external power source, to receive a battery power, and to output a second power comprising at least one of the first power or the battery power to an external load;
a battery pack coupled to the power supply circuit, the battery pack comprising a plurality of batteries, which are arranged into a plurality of battery groups comprising a first battery group and a second battery group, and configured to provide the battery power; and
a controller configured to control the power supply circuit and the battery pack according to at least one of a status of the external power source, a status of the external load, a status of the first battery group, or a status of the second battery group,
wherein the battery pack is configured to selectively supply a power of the first battery group or a power of the second battery group as the battery power to the power supply circuit according to at least one of a status of the external power source, a status of the external load, a status of the first battery group, or a status of the second battery group,
wherein the battery pack further comprises a battery management system configured to control charging and discharging of each of the first battery group and the second battery group according to a battery control signal from the controller,
wherein the power supply circuit comprises:
an input terminal configured to receive the first power;
an output terminal configured to output the second power;
a first power converter coupled between the input terminal and a first node, and configured to convert the first power to a converted first power having a voltage suitable for charging the batteries, and to output the converted first power to the first node; and
a second power converter coupled between the first node and the output terminal, and configured to convert the converted first power or the battery power to the second power having a voltage suitable for use by the external load, and to output the second power to the output terminal, and
wherein the first battery group and the second battery group are selectively electrically coupled to the first node.
2. The power supply of claim 1,
wherein the power supply circuit further comprises a bypass circuit coupled between the input terminal and the output terminal, and configured to transfer the first power to the output terminal without conversion in response to a bypass control signal from the controller.
3. The power supply of claim 1,
wherein the power supply circuit further comprises:
a first switch interposed between the input terminal and the first power converter, and configured to electrically couple the input terminal to the first power converter in response to a first switch control signal from the controller; and
a second switch interposed between the second power converter and the output terminal, and configured to electrically couple the second power converter to the output terminal in response to a second switch control signal from the controller.
4. The power supply of claim 1,
wherein the battery pack further comprises:
a first battery group switch interposed between the first node and the first battery group, and configured to electrically couple the first battery group to the first node in response to a first battery group switch control signal from the battery management system; and
a second battery group switch interposed between the first node and the second battery group, and configured to electrically couple the second battery group to the first node in response to a second battery group switch control signal from the battery management system, and wherein the battery management system is configured to generate the first and second battery group switch control signals according to the battery control signal.

5. The power supply of claim 1, wherein the controller is configured to:

determine an occurrence of a first emergency situation or a second emergency situation, which is different from the first emergency situation, according to at least one of the status of the external source or the external load.

6. The power supply of claim 5, wherein the controller is configured to:

when the controller determines the first emergency situation has occurred, generate the battery control signal to selectively discharge the first battery group or the second battery group such that the second power comprises the power of the first battery group or the second battery group, and to operate the non-selected one of the first and second battery groups in a stand-by mode;

determine whether or not the first emergency situation has finished;

after the first emergency situation has finished, generate the battery control signal to stop discharging the selected one of the first and second battery groups; and select between the first and second battery groups for discharge.

7. The power supply of claim 6, wherein the controller is configured to dynamically select between the first and second battery groups for discharge.

8. The power supply of claim 6, wherein the power supply circuit is configured to concurrently supply the first power and the power of the first battery group or the second battery group, such that the second power comprises the power of the first battery group or the second battery group, and the first power.

9. The power supply of claim 5, wherein the controller is configured to:

compare state of charge (SOC) values of the plurality of battery groups to each other;

when the SOC value of one of the plurality of battery groups is the greatest among the SOC values of all of the plurality of battery groups, generate the battery control signal to discharge the one of the battery groups such that the second power comprises the power of the one of the battery groups, and to operate all other ones of the plurality of battery groups in a stand-by mode;

determine whether or not the first emergency situation or the second emergency situation has finished; and after the first emergency situation or the second emergency situation has finished, generate the battery control signal to stop discharging the one of the plurality of battery groups.

10. The power supply of claim 5, wherein the controller is configured to:

compare discharge numbers of the plurality of battery groups to each other;

when the discharge number of one of the plurality of battery groups is the least from among the discharge numbers, generate the battery control signal to discharge the one of the plurality of battery groups, and to operate all other ones of the plurality of battery groups in a stand-by mode;

determine whether or not the first emergency situation or the second emergency situation has finished; and after the first emergency situation or the second emergency situation has finished, generate the battery control signal to stop discharging the one of the plurality of battery groups.

11. The power supply of claim 5, wherein the controller is configured to:

compare temperatures of the plurality of battery groups to each other;

when a temperature of one of the plurality of battery groups is the least from among the temperatures of the plurality of battery groups, generate the battery control signal to discharge the one of the battery groups such that the second power comprises the power of the one of the battery groups, and to operate all other ones of the plurality of battery groups in a stand-by mode;

determine whether or not the first emergency situation or the second emergency situation has finished; and after the first emergency situation or the second emergency situation has finished, generate the battery control signal to stop discharging the one of the plurality of battery groups.

12. The power supply of claim 5, wherein the controller is configured to:

determine the occurrence of the first emergency situation when a stoppage of the external power source occurs; and determine the occurrence of the second emergency situation when a power requirement of the external load is greater than the power of the external power source.

13. The power supply of claim 1, wherein the battery pack further comprises:

a first temperature sensor configured to sense a temperature of the first battery group and to transmit the sensed temperature of the first battery group to the battery management system; and a second temperature sensor configured to sense a temperature of the second battery group and to transmit the sensed temperature of the second battery group to the battery management system.

14. A battery pack for supplying power to an external device comprising:

a plurality of batteries, which are arranged into a plurality of battery groups; and a battery management system configured to:
monitor a status of each of the battery groups, each status comprising at least one of a state of charge (SOC), a discharge number, or a temperature of a corresponding one of the battery groups;

monitor a status of the external device;

select at least one of the battery groups from among the battery groups to discharge its power to the external device according to the status of each of the battery groups and the status of the external device;

control the remaining battery groups that were not selected to operate in a stand-by mode;

compare the discharge numbers of the battery groups to each other; and when the discharge number of one of the battery groups is the lowest among the discharge numbers of all of the battery groups, select the one of the battery groups to discharge its power to the external device, and operate all other ones of the battery groups in a stand-by mode.

15. The battery pack of claim 14, further comprising a plurality of switches, wherein each switch is coupled to a corresponding one of the battery groups and an output node, and the battery management system is configured to control the switches to selectively couple the battery groups to the output node.

16. The battery pack of claim 15, wherein the battery management system is configured to:
   compare the state of charge (SOC) values of the battery groups to each other; and
   when the SOC value of one of the battery groups is the greatest among the SOC values of all of the battery groups, select the one of the battery groups to discharge its power to the external device, and operate all other ones of the battery groups in a stand-by mode.

17. The battery pack of claim 15, wherein the battery management system is configured to:
   compare temperature values of the battery groups to each other; and
   when a temperature value of one of the battery groups is the lowest among the temperature values of all of the battery groups, select the one of the battery groups to discharge its power to the external device, and operate all other ones of the battery groups in a stand-by mode.

* * * * *